United States Patent
Cruikshank et al.

(10) Patent No.: US 12,450,530 B2
(45) Date of Patent: Oct. 21, 2025

(54) METHOD AND SYSTEM FOR AUTOMATED SYSTEM ONBOARDING

(71) Applicant: JPMorgan Chase Bank, N.A., New York, NY (US)

(72) Inventors: Peter Cruikshank, Tampa, FL (US); Jerry Russo, Tampa, FL (US); Bryan Rooke, Lake Mary, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 653 days.

(21) Appl. No.: 17/810,734

(22) Filed: Jul. 5, 2022

(65) Prior Publication Data
US 2024/0013109 A1  Jan. 11, 2024

(51) Int. Cl.
| | | |
|---|---|---|
| G06F 8/77 | (2018.01) | |
| G06F 8/60 | (2018.01) | |
| G06F 8/61 | (2018.01) | |
| G06F 9/445 | (2018.01) | |
| G06F 11/30 | (2006.01) | |
| G06Q 10/0631 | (2023.01) | |
| G06F 8/10 | (2018.01) | |
| G06F 9/50 | (2006.01) | |
| H04L 41/00 | (2022.01) | |
| H04L 41/14 | (2022.01) | |
| H04L 41/50 | (2022.01) | |

(52) U.S. Cl.
CPC ......... *G06Q 10/06311* (2013.01); *G06F 8/60* (2013.01); *G06F 8/10* (2013.01); *G06F 8/61* (2013.01); *G06F 8/77* (2013.01); *G06F 9/505* (2013.01); *G06F 9/5088* (2013.01); *H04L 41/14* (2013.01); *H04L 41/20* (2013.01); *H04L 41/50* (2013.01)

(58) Field of Classification Search
CPC ...... G06Q 10/06311; G06Q 10/063118; G06F 8/60; G06F 8/77; G06F 8/10; G06F 8/61; G06F 9/5088; G06F 9/505; H04L 41/14; H04L 41/50; H04L 41/20
See application file for complete search history.

(56) References Cited

U.S. PATENT DOCUMENTS

| | | | |
|---|---|---|---|
| 11,469,944 B1 * | 10/2022 | Lindholm | H04L 41/0897 |
| 11,630,747 B1 * | 4/2023 | Deboy | G06F 11/3409 |
| | | | 714/22 |
| 2016/0065417 A1 * | 3/2016 | Sapuram | G06F 8/60 |
| | | | 709/223 |
| 2017/0199770 A1 * | 7/2017 | Peteva | G06F 9/5088 |

(Continued)

*Primary Examiner* — Anibal Rivera
(74) *Attorney, Agent, or Firm* — GREENBLUM & BERNSTEIN, P.L.C.

(57) ABSTRACT

A method for facilitating automated system onboarding is disclosed. The method includes receiving, via a graphical user interface, onboarding requests from a user, the onboarding requests including system parameters that correspond to user systems; automatically validating the onboarding requests and the system parameters; automatically generating, based on a result of the validating, communication interfaces in response to the onboarding requests; automatically testing the communication interfaces; implementing the communication interfaces based on a result of the testing; and generating a log, the log including information that relates to the automatic validating, the automatic generating, and the automatic testing.

18 Claims, 10 Drawing Sheets

(56) References Cited

U.S. PATENT DOCUMENTS

| | | | |
|---|---|---|---|
| 2018/0260760 A1* | 9/2018 | Srivastava | G06N 5/04 |
| 2020/0162337 A1* | 5/2020 | Jain | H04L 41/142 |
| 2021/0075689 A1* | 3/2021 | Ramanathan | H04L 41/147 |
| 2021/0200814 A1* | 7/2021 | Tal | G06F 16/90335 |
| 2022/0019657 A1* | 1/2022 | Sethumadhavan | G06F 21/53 |
| 2022/0166669 A1* | 5/2022 | Sharma | H04L 43/50 |

* cited by examiner

DEPLOYMENT DIAGRAM
THIS DIAGRAM SHOWS DIFFERENT ECOSYSTEMS AND THEIR INTERACTION WITH EACH OTHER AND OTHER APPLICATIONS.

METHOD AND SYSTEM FOR AUTOMATED SYSTEM ONBOARDING

BACKGROUND

1. Field of the Disclosure

This technology generally relates to methods and systems for onboarding client systems, and more particularly to methods and systems for facilitating automated onboarding of client systems based on validated system parameter inputs.

2. Background Information

Many entities operate expansive enterprise network environments that include numerous services such as, for example, microservice applications operating in a complex choreography. Often, to provide services for clients, the entities must onboard client systems to facilitate integration with the services in the enterprise network environments. Historically, implementations of conventional onboarding techniques have resulted in varying degrees of success with respect to effective, consistent, and timely onboarding of client systems.

One drawback of using the conventional onboarding techniques is that in many instances, the integration of the client systems with the enterprise network environment depends on various system parameters. As a result, standardizing the client system onboarding process to ensure onboarding consistency and to shorten onboarding timelines may be difficult. Additionally, due to non-standardized onboarding, the client system may not be effectively integrated with the enterprise network environment resulting in inefficient resource utilization.

Therefore, there is a need to facilitate onboarding of client systems by automatically managing third party agreements, client profiles, and issue tracking platform integrations based on validated system parameter inputs.

SUMMARY

The present disclosure, through one or more of its various aspects, embodiments, and/or specific features or sub-components, provides, inter alia, various systems, servers, devices, methods, media, programs, and platforms for facilitating automated onboarding of client systems based on validated system parameter inputs.

According to an aspect of the present disclosure, a method for facilitating automated system onboarding is disclosed. The method is implemented by at least one processor. The method may include receiving, via a graphical user interface, at least one onboarding request from a user, the at least one onboarding request may include at least one system parameter that corresponds to at least one user system; automatically validating the at least one onboarding request and the at least one system parameter; automatically generating, based on a result of the validating, at least one communication interface in response to the at least one onboarding request; automatically testing the at least one communication interface; implementing the at least one communication interface based on a result of the testing; and generating at least one log, the at least one log may include information that relates to the automatic validating, the automatic generating, and the automatic testing.

In accordance with an exemplary embodiment, the method may further include automatically detecting at least one error that corresponds to the at least one communication interface based on a result of the automatic testing; automatically identifying at least one resolution action for each of the at least one error; and automatically initiating the at least one resolution action based on a predetermined setting.

In accordance with an exemplary embodiment, the at least one resolution action may include at least one from among a first action to generate a service ticket in an issue tracking platform, a second action to track a status of the generated service ticket, a third action to notify at least one responsible party, and a fourth action to persist information that relates to the at least one error in the at least one log.

In accordance with an exemplary embodiment, the at least one onboarding request may correspond to a request to onboard the at least one user system, the onboarding may relate to an integration of the at least one user system with a plurality of services in an enterprise network environment.

In accordance with an exemplary embodiment, to receive the at least one onboarding request, the method may further include receiving, via the graphical user interface, at least one first user input, the at least one first user input may include information that relates to the at least one user system; automatically determining whether supplemental user system data are required from the user based on the at least one first user input and a predetermined guideline; generating, based on a result of the determining, at least one graphical element, the at least one graphical element may include at least one instruction for the user and an input field to receive at least one second user input; and displaying, via the graphical user interface, the at least one graphical element.

In accordance with an exemplary embodiment, to automatically generate the at least one communication interface, the method may further include automatically configuring at least one application programming interface based on the at least one system parameter; and automatically generating at least one key for the at least one user system, the at least one key may enable communication via the at least one application programming interface.

In accordance with an exemplary embodiment, the at least one application programming interface may link the at least one user system with a plurality of services in an enterprise network environment.

In accordance with an exemplary embodiment, to automatically test the at least one communication interface, the method may further include generating at least one task list for each of the at least one communication interface based on at least one predetermined criterion, the at least one task list may include at least one test and at least one testing sequence; and initiating the at least one test according to the at least one testing sequence.

In accordance with an exemplary embodiment, the method may further include monitoring a data stream that corresponds to each of the at least one communication interface; and identifying at least one issue that is associated with a downstream service based on the data stream.

According to an aspect of the present disclosure, a computing device configured to implement an execution of a method for facilitating automated system onboarding is disclosed. The computing device including a processor; a memory; and a data transmission interface coupled to each of the processor and the memory, wherein the processor may be configured to receive, via a graphical user interface, at least one onboarding request from a user, the at least one onboarding request may include at least one system parameter that corresponds to at least one user system; automatically validate the at least one onboarding request and the at least one system parameter; automatically generate, based on a result of the validating, at least one communication interface in response to the at least one onboarding request; automatically test the at least one communication interface; implement the at least one communication interface based on a result of the testing; and generate at least one log, the at least one log may include information that relates to the automatic validating, the automatic generating, and the automatic testing.

In accordance with an exemplary embodiment, the processor may be further configured to automatically detect at least one error that corresponds to the at least one communication interface based on a result of the automatic testing; automatically identify at least one resolution action for each of the at least one error; and automatically initiate the at least one resolution action based on a predetermined setting.

In accordance with an exemplary embodiment, the at least one resolution action may include at least one from among a first action to generate a service ticket in an issue tracking platform, a second action to track a status of the generated service ticket, a third action to notify at least one responsible party, and a fourth action to persist information that relates to the at least one error in the at least one log.

In accordance with an exemplary embodiment, the at least one onboarding request may correspond to a request to onboard the at least one user system, the onboarding may relate to an integration of the at least one user system with a plurality of services in an enterprise network environment.

In accordance with an exemplary embodiment, to receive the at least one onboarding request, the processor may be further configured to receive, via the graphical user interface, at least one first user input, the at least one first user input may include information that relates to the at least one user system; automatically determine whether supplemental user system data are required from the user based on the at least one first user input and a predetermined guideline; generate, based on a result of the determining, at least one graphical element, the at least one graphical element may include at least one instruction for the user and an input field to receive at least one second user input; and display, via the graphical user interface, the at least one graphical element.

In accordance with an exemplary embodiment, to automatically generate the at least one communication interface, the processor may be further configured to automatically configure at least one application programming interface based on the at least one system parameter; and automatically generate at least one key for the at least one user system, the at least one key may enable communication via the at least one application programming interface.

In accordance with an exemplary embodiment, the at least one application programming interface may link the at least one user system with a plurality of services in an enterprise network environment.

In accordance with an exemplary embodiment, to automatically test the at least one communication interface, the processor may be further configured to generate at least one task list for each of the at least one communication interface based on at least one predetermined criterion, the at least one task list may include at least one test and at least one testing sequence; and initiate the at least one test according to the at least one testing sequence.

In accordance with an exemplary embodiment, the processor may be further configured to monitor a data stream that corresponds to each of the at least one communication interface; and identify at least one issue that is associated with a downstream service based on the data stream.

According to an aspect of the present disclosure, a non-transitory computer readable storage medium storing instructions for facilitating automated system onboarding is disclosed. The storage medium including executable code which, when executed by a processor, may cause the processor to receive, via a graphical user interface, at least one onboarding request from a user, the at least one onboarding request may include at least one system parameter that corresponds to at least one user system; automatically validate the at least one onboarding request and the at least one system parameter; automatically generate, based on a result of the validating, at least one communication interface in response to the at least one onboarding request; automatically test the at least one communication interface; implement the at least one communication interface based on a result of the testing; and generate at least one log, the at least one log may include information that relates to the automatic validating, the automatic generating, and the automatic testing.

In accordance with an exemplary embodiment, the at least one onboarding request may correspond to a request to onboard the at least one user system, the onboarding may relate to an integration of the at least one user system with a plurality of services in an enterprise network environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
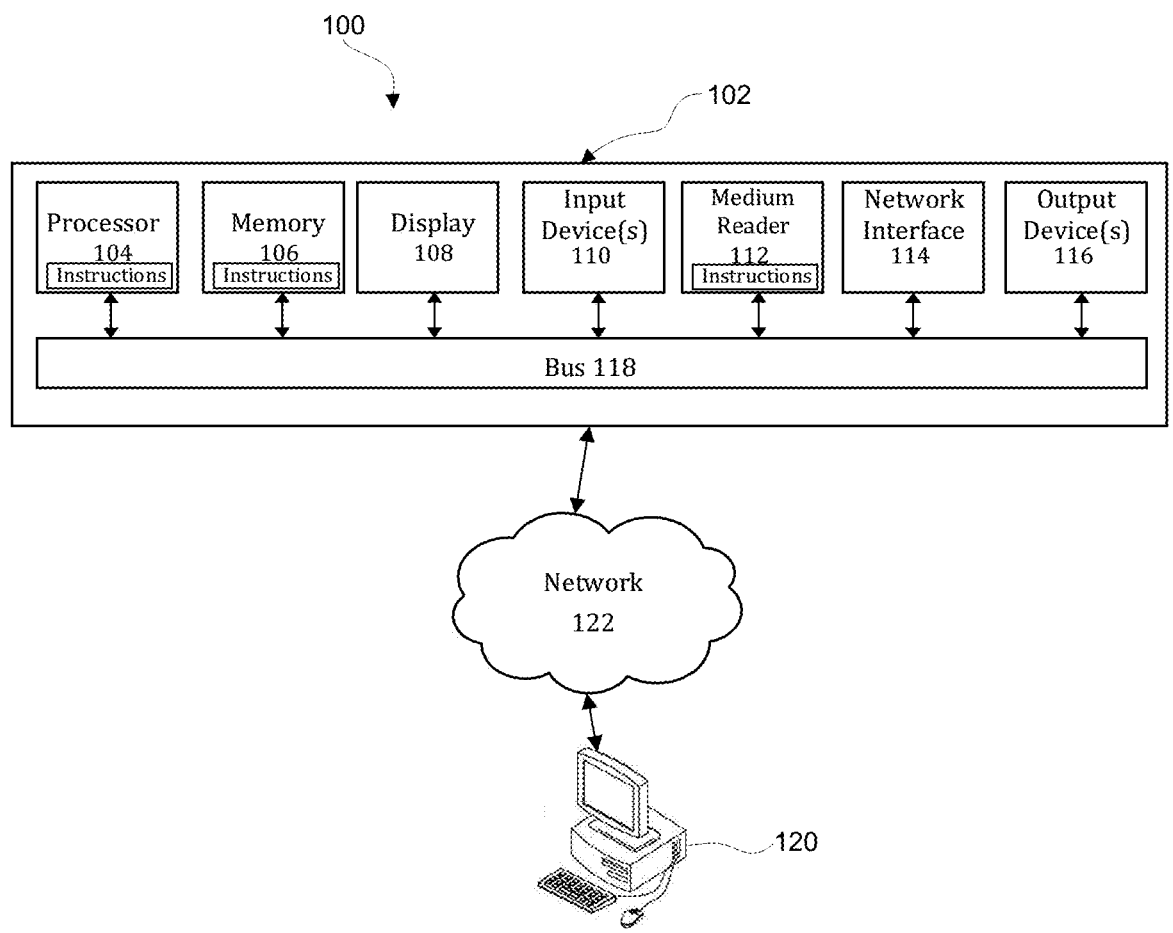
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated onboarding of client systems based on validated system parameter inputs.

Figure 2:
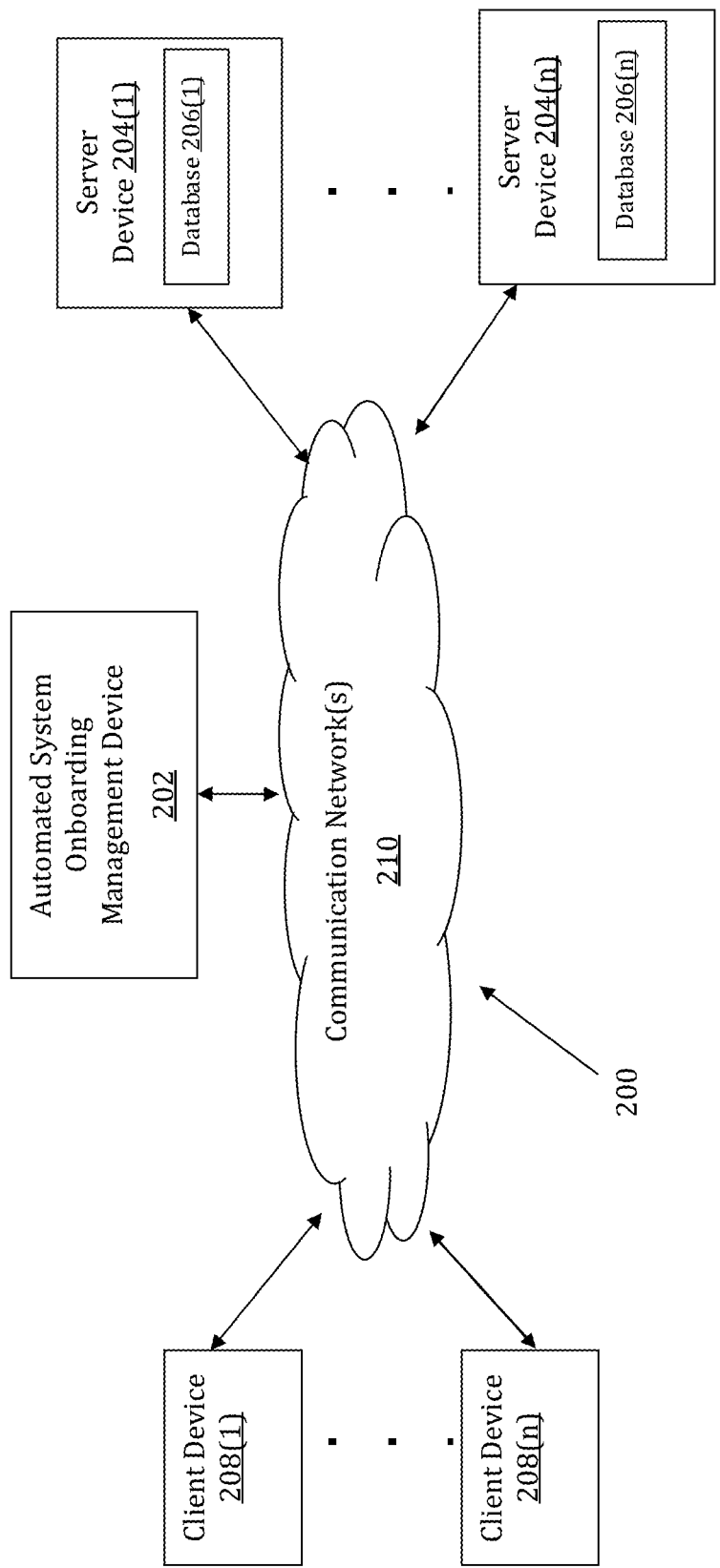
FIG. 2 illustrates an exemplary diagram of a network environment.

Referring to FIG. 2, a schematic of an exemplary network environment 200 for implementing a method for facilitating automated onboarding of client systems based on validated system parameter inputs is illustrated. In an exemplary embodiment, the method is executable on any networked computer platform, such as, for example, a personal computer (PC).

The method for facilitating automated onboarding of client systems based on validated system parameter inputs may be implemented by an Automated System Onboarding Management (ASOM) device 202. The ASOM device 202 may be the same or similar to the computer system 102 as described with respect to FIG. 1. The ASOM device 202 may store one or more applications that can include executable instructions that, when executed by the ASOM device 202, cause the ASOM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASOM device 202 itself, may be located in virtual server(s) running in a cloud-based computing environment rather than being tied to one or more specific physical network computing devices. Also, the application(s) may be running in one or more virtual machines (VMs) executing on the ASOM device 202. Additionally, in one or more embodiments of this technology, virtual machine(s) running on the ASOM device 202 may be managed or supervised by a hypervisor.

In the network environment 200 of FIG. 2, the ASOM device 202 is coupled to a plurality of server devices 204(1)-204(n) that hosts a plurality of databases 206(1)-206(n), and also to a plurality of client devices 208(1)-208(n) via communication network(s) 210. A communication interface of the ASOM device 202, such as the network interface 114 of the computer system 102 of FIG. 1, operatively couples and communicates between the ASOM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASOM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ASOM devices that efficiently implement a method for facilitating automated onboarding of client systems based on validated system parameter inputs.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASOM device 202 may be a standalone device or integrated with one or more other devices or apparatuses, such as one or more of the server devices 204(1)-204(n), for example. In one particular example, the ASOM device 202 may include or be hosted by one of the server devices 204(1)-204(n), and other arrangements are also possible. Moreover, one or more of the devices of the ASOM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASOM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to onboarding requests, system parameters, user systems, communication interfaces, tests, and logs.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ASOM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ASOM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ASOM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASOM device 202, the server devices 204(1)-204(n), or the client devices 208(1)-208(n), for example, may be configured to operate as virtual instances on the same physical machine. In other words, one or more of the ASOM device 202, the server devices 204(1)-204(n), or the client devices 208(1)-208(n) may operate on the same physical device rather than as separate devices communicating through communication network(s) 210. Additionally, there may be more or fewer ASOM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
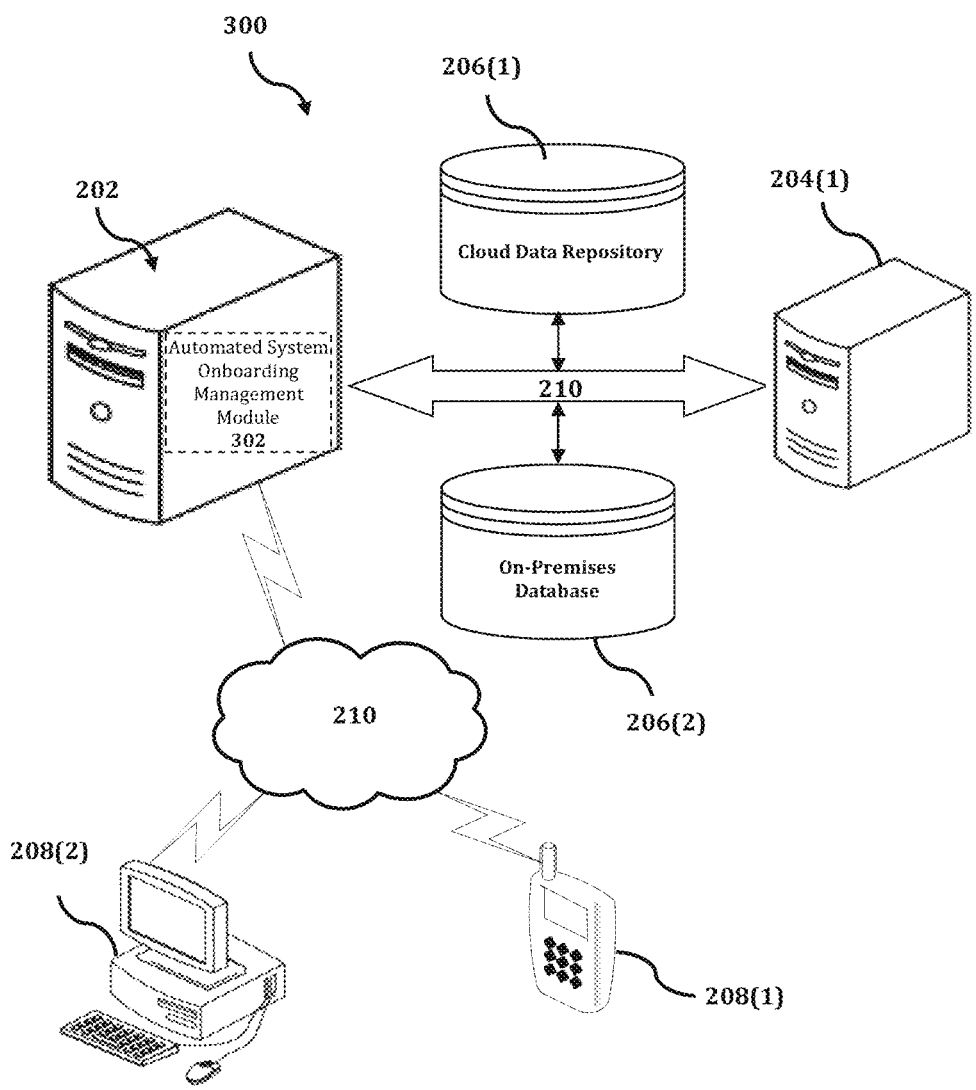
FIG. 3 shows an exemplary system for implementing a method for facilitating automated onboarding of client systems based on validated system parameter inputs.

The ASOM device 202 is described and shown in FIG. 3 as including an automated system onboarding management module 302, although it may include other rules, policies, modules, databases, or applications, for example. As will be described below, the automated system onboarding management module 302 is configured to implement a method for facilitating automated onboarding of client systems based on validated system parameter inputs.

An exemplary process 300 for implementing a mechanism for facilitating automated onboarding of client systems based on validated system parameter inputs by utilizing the network environment of FIG. 2 is shown as being executed in FIG. 3. Specifically, a first client device 208(1) and a second client device 208(2) are illustrated as being in communication with ASOM device 202. In this regard, the first client device 208(1) and the second client device 208(2) may be "clients" of the ASOM device 202 and are described herein as such. Nevertheless, it is to be known and understood that the first client device 208(1) and/or the second client device 208(2) need not necessarily be "clients" of the ASOM device 202, or any entity described in association therewith herein. Any additional or alternative relationship may exist between either or both of the first client device 208(1) and the second client device 208(2) and the ASOM device 202, or no relationship may exist.

Further, ASOM device 202 is illustrated as being able to access a cloud data repository 206(1) and an on-premises database 206(2). The automated system onboarding management module 302 may be configured to access these databases for implementing a method for facilitating automated onboarding of client systems based on validated system parameter inputs.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASOM device 202 via broadband or cellular communication. Of course, these embodiments are merely exemplary and are not limiting or exhaustive.

Upon being started, the automated system onboarding management module 302 executes a process for facilitating automated onboarding of client systems based on validated system parameter inputs. An exemplary process for facilitating automated onboarding of client systems based on validated system parameter inputs is generally indicated at flowchart 400 in FIG. 4.

Figure 4:
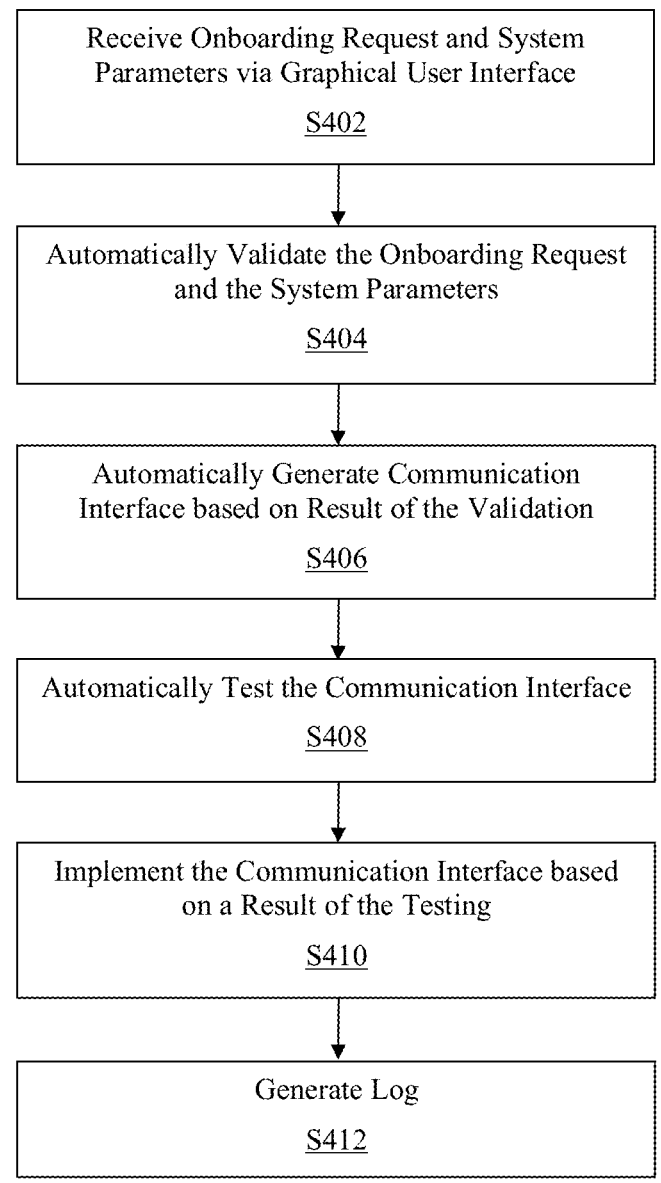
FIG. 4 is a flowchart of an exemplary process for implementing a method for facilitating automated onboarding of client systems based on validated system parameter inputs.

In the process 400 of FIG. 4, at step S402, onboarding requests may be received from a user. The onboarding requests may be received via a graphical user interface. In an exemplary embodiment, the onboarding requests may include system parameters that correspond to a user system such as, for example, a client system. The onboarding requests may correspond to a request to onboard the user system. The onboarding process may relate to an integration of the user system with a plurality of services in an enterprise network environment.

In another exemplary embodiment, dynamically variable input fields may be used to receive the onboarding requests via the graphical user interface. The dynamically variable input fields may be adjusted in real-time in response to user input. For example, a dynamically variable input field such as a smart field may be adjusted in real-time to provide and/or request information from the user based on the user inputs.

In another exemplary embodiment, to receive the onboarding requests, a first user input may be received via the graphical user interface. The first user input may include information that relates to the user system. Whether supplemental user system data are required from the user may be automatically determined based on the first user input and a predetermined guideline. The predetermined guideline may include a technical guideline for onboarding, a business guideline for onboarding, and a regulatory guideline for onboarding the user system.

Then, a graphical element may be generated based on a result of the determining. The graphical element may include instructions for the user and an input field to receive a second user input. For example, the instructions may request supplemental information from the user as the second user input via the input field. Finally, the graphical element may be displayed via the graphical user interface.

In another exemplary embodiment, the system parameters may include information that relates to the user system. The information may correspond to a numerical factor and/or other measurable factors forming one of a set that defines the user system and/or sets the conditions for operation of the user system. The information may define operational characteristics such as, for example, operational capabilities of the user system as well as operational requirements such as, for example, requirements of a third-party agreement.

In another exemplary embodiment, the user system may include a plurality of services such as, for example, a plurality of applications in an enterprise network environment. The plurality of applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the onboarding requests and the system parameters may be automatically validated. In an exemplary embodiment, the system parameters may be parsed to extract data for comparison with predetermined technical requirements. The comparison may ensure compatibility between the user system and the enterprise network environment. In another exemplary embodiment, the system parameters may be parsed to ensure that appropriate information is provided for automated system onboarding consistent with present disclosures. For example, the system parameters may be validated to ensure that a numerical parameter does not contain alphabetical inputs.

In another exemplary embodiment, a validation notification may be provided to an associated user based on a result of the validation. The validation notification may include information such as, for example, validation status information and validation error information. In another exemplary embodiment, a validation error may be automatically corrected based on input from the user via the validation notification. For example, the system parameters may be automatically corrected based on new identifier information provided by the associated user in response to the validation notification.

At step S406, a communication interface may be automatically generated in response to the onboarding requests. The communication interface may be automatically generated based on a result of the validating without additional input from the user. In an exemplary embodiment, the communication interface may correspond to an interface and/or a protocol that enables a computing device to communicate with another computing device. The automatically generated communication interface may enable communication between the user system and the enterprise network environment. As will be appreciated by a person of ordinary skill in the art, computing components within the user system may utilize the communication interface to communicate with computing components within the enterprise network environment to facilitate system integration consistent with present disclosures.

In another exemplary embodiment, to generate the communication interface, an application programming interface (API) may be automatically configured based on the system parameters. The API may correspond to a software intermediary that allows at least two software applications to communicate with each other. In another exemplary embodiment, the API may link the user system with a plurality of services in the enterprise network environment. The API may facilitate interactions between multiple software applications by defining parameters such as, for example, the kind of calls and/or requests that can be made, how the calls and/or requests are made, the data formats that should be used, and the conventions that must be followed.

In another exemplary embodiment, cryptographic keys for the user system may also be automatically generated. The cryptographic keys may facilitate authentication and enable communication via the API. In another exemplary embodiment, the cryptographic keys may correspond to a piece of information that enables the encoding and/or decoding of cryptographic data. The piece of information may correspond to strings of numbers and/or letters that are usable to encrypt and decrypt the cryptographic data. In another exemplary embodiment, the cryptographic keys may be automatically generated according to a task list. Consistent with present disclosures, the task list may indicate that cryptographic keys are required and a sequence for generating the cryptographic keys.

In another exemplary embodiment, an agreement such as, for example, a third-party agreement (TPA) may be automatically generated in response to the onboarding requests. The TPA may be generated based on a result of the validating using information in the onboarding requests. In another exemplary embodiment, the TPA may outline an agreement between the user system and the enterprise network environment. The outline may define the terms of the agreement.

In another exemplary embodiment, a profile such as, for example, a client profile may be automatically generated in response to the onboarding requests. The client profile may be generated based on a result of the validating using information in the onboarding requests. In another exemplary embodiment, the generated client profile may be associated with the user and include identifying information that corresponds to the user. For example, the client profile may include a partner identifier that corresponds to the user and usable to recognize as well as verify user communications.

At step S408, the communication interface may be automatically tested. The communication interface may be automatically tested based on predetermined testing requirements. In an exemplary embodiment, to automatically test the communication interface, task lists may be generated for the communication interface based on a predetermined criterion. The task lists may include prescribed tests and a testing sequence. For example, the task lists may indicate the need for user acceptance testing (UAT) and the scheduling for the UAT. Then, the prescribed tests may be initiated according to the testing sequence. Consistent with present disclosure, the prescribed tests may be automatically initiated without additional user intervention.

At step S410, the communication interface may be implemented based on a result of the testing. Implementation of the communication interface may correspond to a transition of the communication interface from a development environment to a production environment. In an exemplary embodiment, the development environment may correspond to a closed operating environment that is usable to test and further refine the communication interface. The development environment may facilitate simulations of a live system without the risks associated with communication interface testing on a live system. In another exemplary embodiment, the production environment may correspond to a live operating environment. The live operating environment may relate to a setting where the communication interface is put into operation according to an intended use by end users.

At step S412, a log may be generated to provide documentation for the automated onboarding process. The log may include information that relates to the automatic validating, the automatic generating, and the automatic testing. In an exemplary embodiment, the log may correspond to a record of events that occurred during the automated onboarding process. The record of events may be associated with the user as well as the corresponding communication interface and persisted in a networked repository.

In another exemplary embodiment, the automated onboarding process may include automatically detecting errors that correspond to the communication interface. The errors may be automatically detected based on a result of the automatic testing. Then, a resolution action for each of the errors may be automatically identified. The resolution action may be automatically initiated based on a predetermined setting. For example, the predetermined setting may indicate that an error with a low severity rating may be automatically resolved, but an error with a high severity rating may require a notification to bring the error to the attention of a responsible party. In another exemplary embodiment the resolution action may include at least one from among a first action to generate a service ticket in an issue tracking platform such as, for example, a GOJIRA (JTRA) platform, a second action to track a status of the generated service ticket, a third action to notify at least one responsible party, and a fourth action to persist information that relates to the at least one error in the at least one log.

In another exemplary embodiment, a data stream that corresponds to the communication interface may be monitored. The data stream may be directed to the disclosed invention as well as captured by the disclosed invention. Then, issues that are associated with a downstream service may be identified based on the data stream. A responsible party may be notified of the identified issues consistent with present disclosures.

Figure 5:
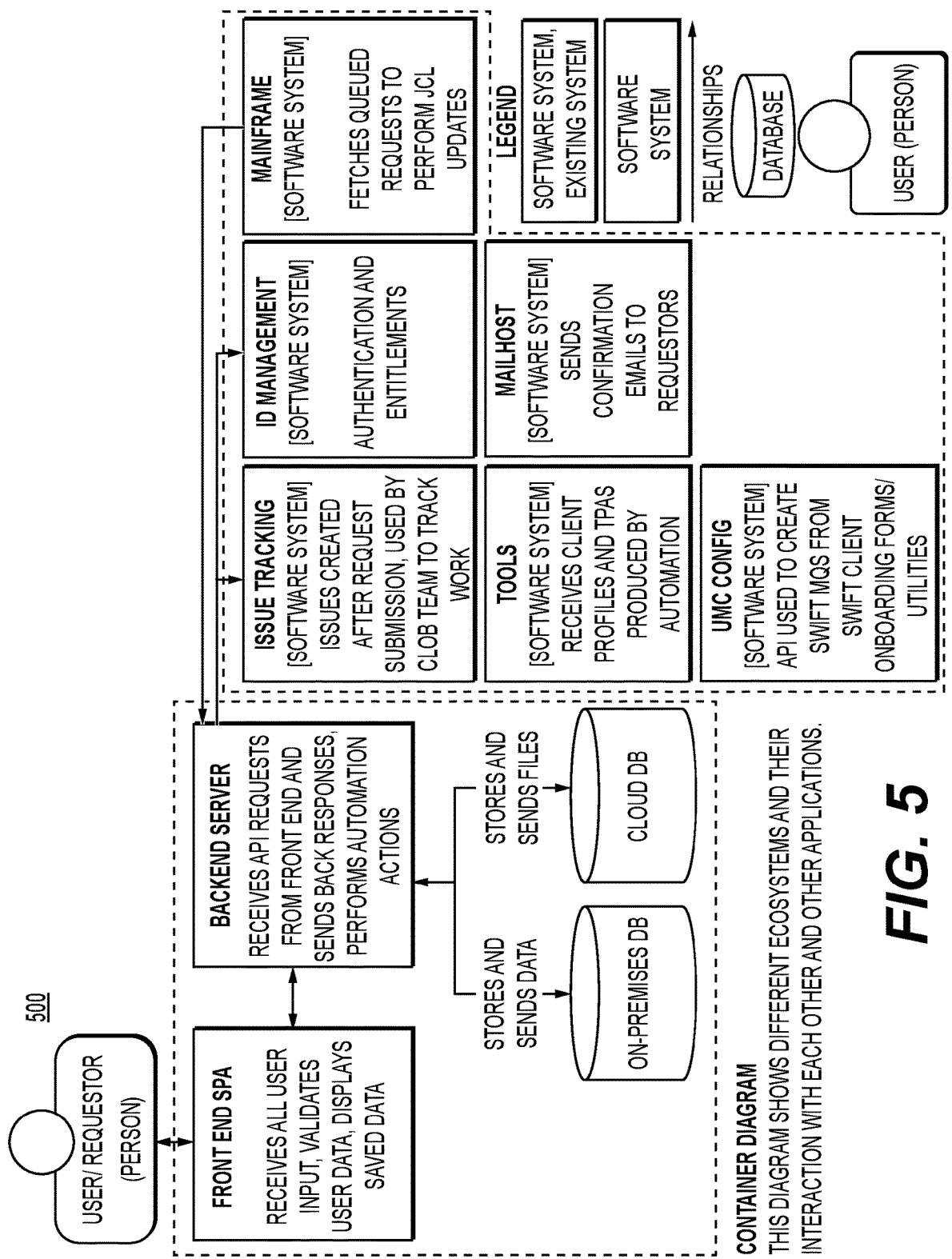
FIG. 5 is a container diagram of an exemplary process for implementing a method for facilitating automated onboarding of client systems based on validated system parameter inputs.

FIG. 5 is a container diagram 500 of an exemplary process for implementing a method for facilitating automated onboarding of client systems based on validated system parameter inputs. In FIG. 5, the container diagram illustrates different ecosystems and interactions between various services within each of the different ecosystems.

As illustrated in FIG. 5, a user and/or requestor may interact with the disclosed invention to facilitate automated onboarding with existing services. The user and/or requestor may interact with a front-end single-page application (SPA) to provide input, validate user data, and access saved data. The SPA may relate to a web application that interacts with the user by dynamically rewriting the current page with new data from a web server. The SPA may provide information to the user based on user input consistent with disclosures in the present application. A backend server may then receive API requests from the front-end SPA and send back responses from existing services and data storage devices. Consistent with present disclosures, the backend server may perform automation actions.

Figure 6:
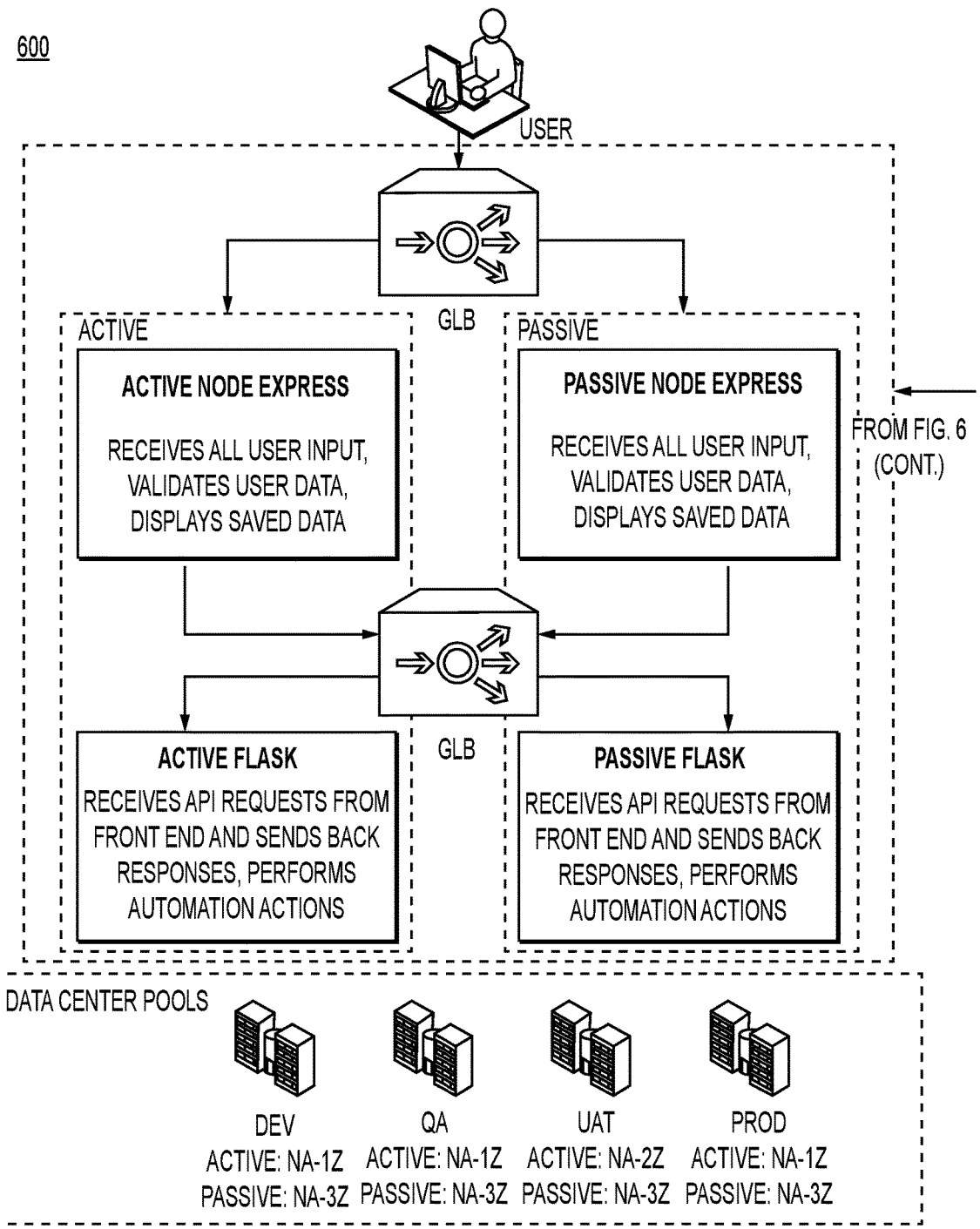
FIG. 6 is a deployment diagram of an exemplary process for implementing a method for facilitating automated onboarding of client systems based on validated system parameter inputs.
Figure 6:
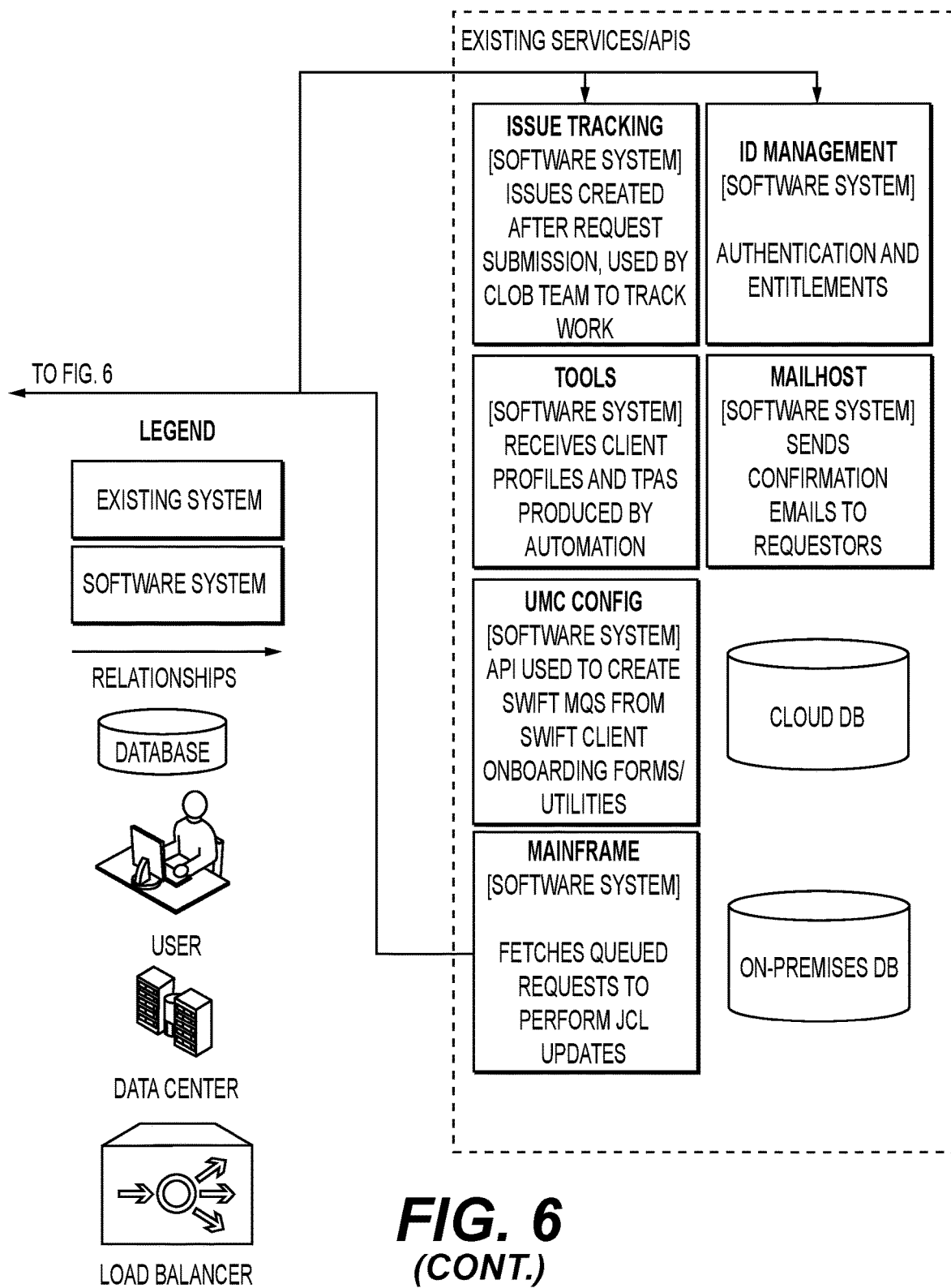

FIG. 6 is a deployment diagram 600 of an exemplary process for implementing a method for facilitating automated onboarding of client systems based on validated system parameter inputs. In FIG. 6, the container diagram illustrates different ecosystems and interactions between various services within each of the different ecosystems.

As illustrated in FIG. 6, a load balancer such as, for example, a global load balancer may be implemented to direct user requests between active nodes and passive nodes. The load balancer may ensure optimal system performance by regulating network traffic between the active nodes and the passive nodes. For example, when network traffic of the active nodes surpass a predetermined threshold, the load balancer may transfer user requests to the passive nodes to improve system performance.

Figure 7:
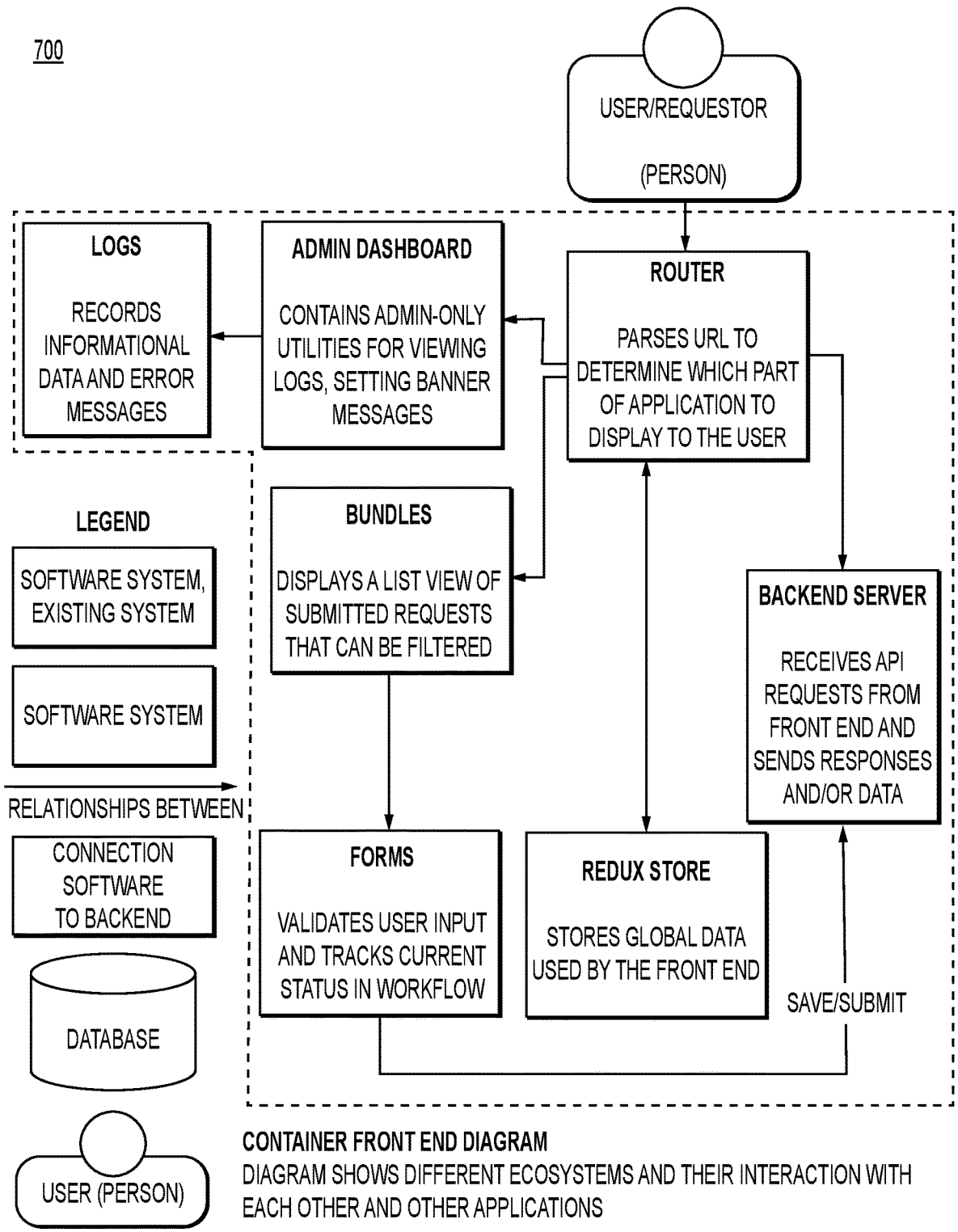
FIG. 7 is a container front end diagram of an exemplary process for implementing a method for facilitating automated onboarding of client systems based on validated system parameter inputs.

FIG. 7 is a container front end diagram 700 of an exemplary process for implementing a method for facilitating automated onboarding of client systems based on validated system parameter inputs. In FIG. 7, the container diagram illustrates different ecosystems and interactions between various services within each of the different ecosystems.

As illustrated in FIG. 7, various front-end services may facilitate interactions between the user and the disclosed system. The front-end services may include a router that parses a uniform resource locator (URL) to determine which part of the application to display to the user. The front-end services may also include an admin dashboard service that contains admin-only utilities for viewing logs and setting banner messages, a bundles service that displays a list view of submitted requests that can be filtered, a forms service that validates user input and tracks current status in workflow, a logs service that records informational data and error messages, and a redux store service that stores global data used by the front-end services.

Figure 8:
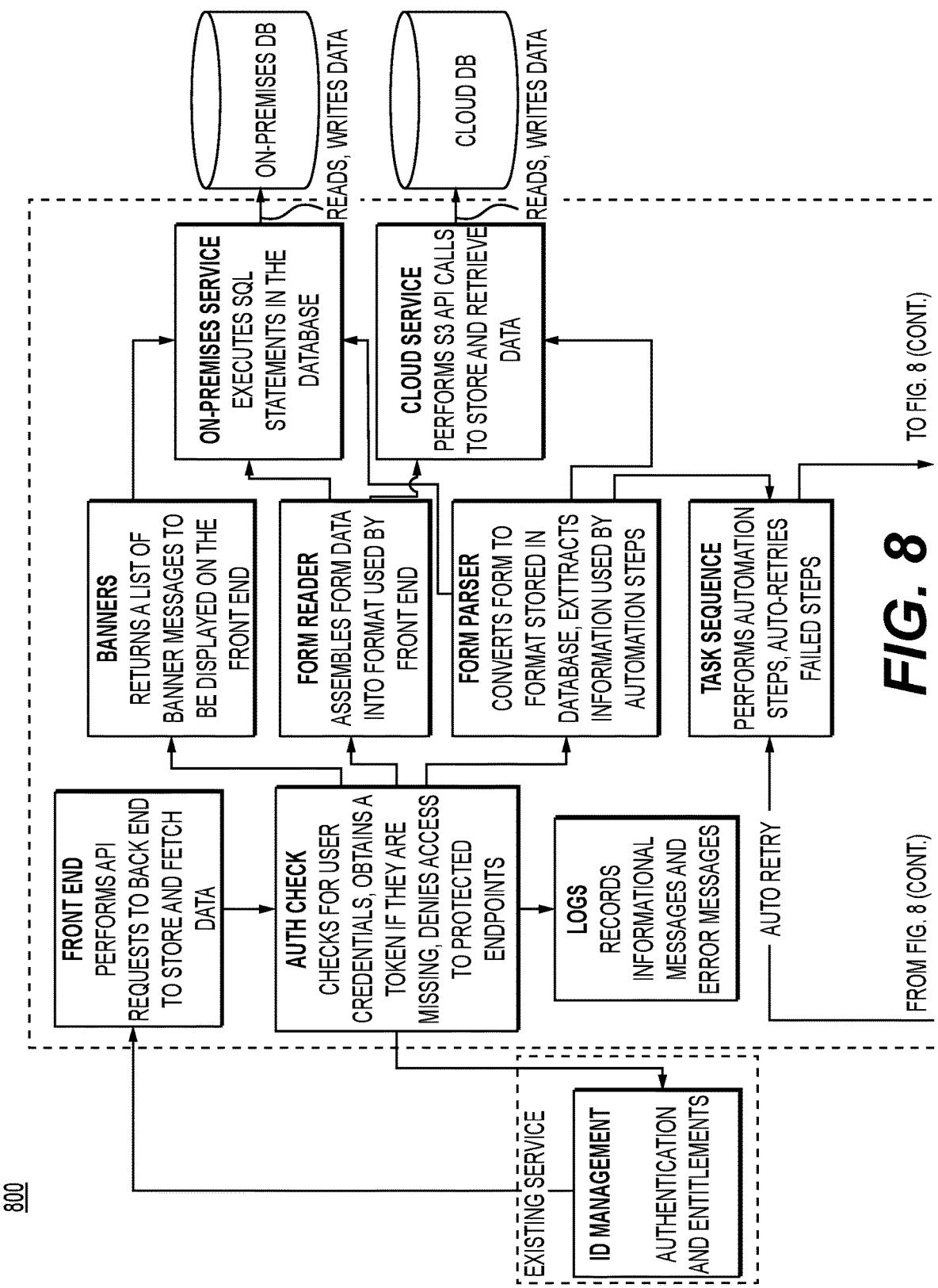
FIG. 8 is a component backend diagram of an exemplary process for implementing a method for facilitating automated onboarding of client systems based on validated system parameter inputs.
Figure 8:
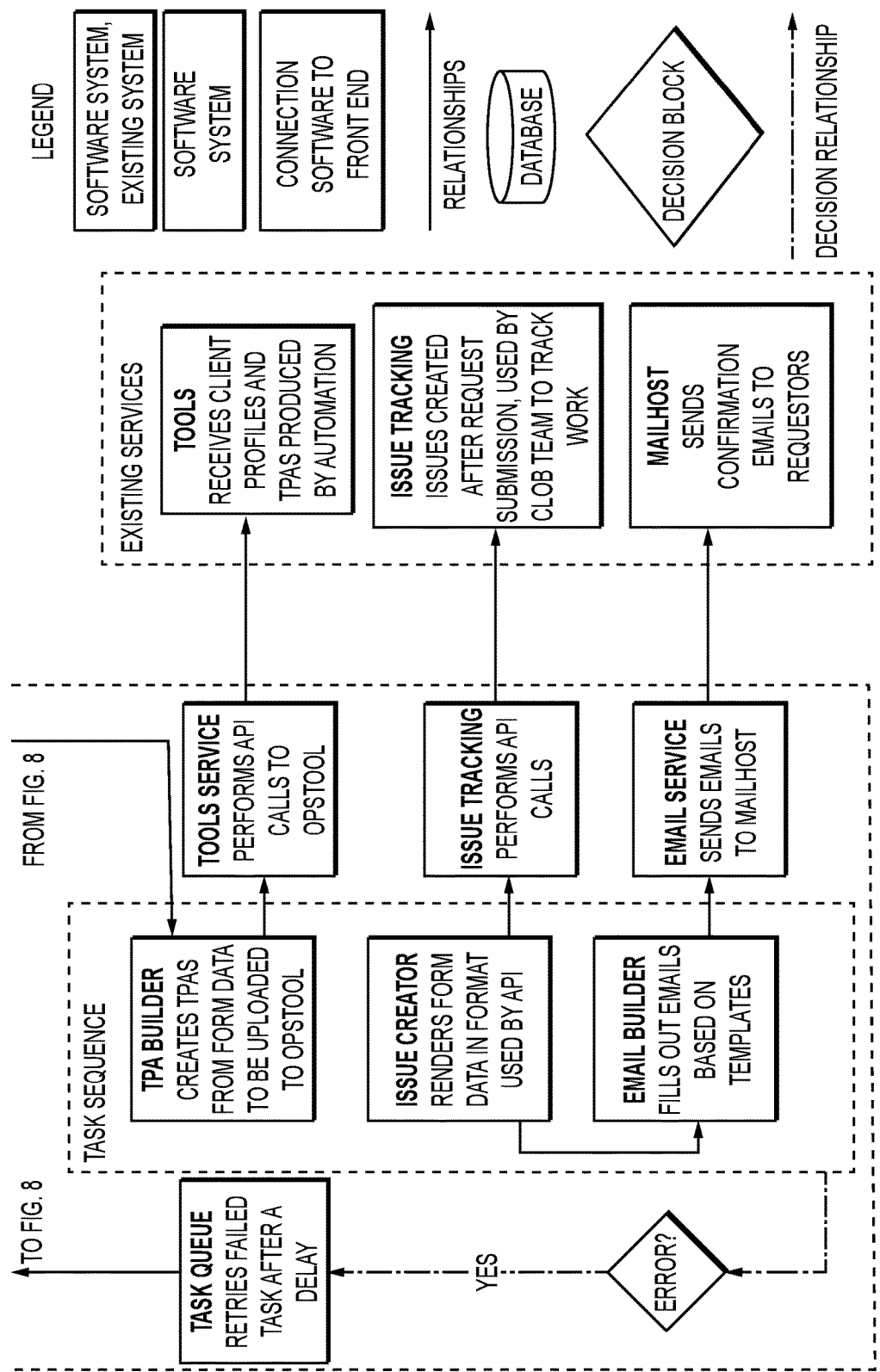

FIG. 8 is a component backend diagram 800 of an exemplary process for implementing a method for facilitating automated onboarding of client systems based on validated system parameter inputs. In FIG. 8, the container diagram illustrates different ecosystems and interactions between various services within each of the different ecosystems.

As illustrated in FIG. 8, the backend server may receive API requests from the front-end SPA and send back responses from existing services and data storage devices. Consistent with present disclosures, the backend server may perform automation actions.

Accordingly, with this technology, an optimized process for facilitating automated onboarding of client systems based on validated system parameter inputs is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated system onboarding, the method being implemented by at least one processor, the method comprising:
   receiving, by the at least one processor via a graphical user interface, at least one onboarding request from a user, the at least one onboarding request including at least one system parameter that corresponds to at least one user system;
   automatically validating, by the at least one processor, the at least one onboarding request and the at least one system parameter;
   automatically generating, by the at least one processor based on a result of the validating, at least one communication interface in response to the at least one onboarding request;
   automatically testing, by the at least one processor, the at least one communication interface;
   implementing, by the at least one processor, the at least one communication interface based on a result of the testing; and
   generating, by the at least one processor, at least one log, the at least one log including information that relates to the automatic validating, the automatic generating, and the automatic testing,
   wherein the automatic generating of the at least one communication interface further comprises:
   automatically configuring, by the at least one processor, at least one application programming interface based on the at least one system parameter; and
   automatically generating, by the at least one processor, at least one key for the at least one user system, the at least one key enabling communication via the at least one application programming interface.

2. The method of claim 1, further comprising:
   automatically detecting, by the at least one processor, at least one error that corresponds to the at least one communication interface based on a result of the automatic testing;
   automatically identifying, by the at least one processor, at least one resolution action for each of the at least one error; and
   automatically initiating, by the at least one processor, the at least one resolution action based on a predetermined setting.

3. The method of claim 2, wherein the at least one resolution action includes at least one from among a first action to generate a service ticket in an issue tracking platform, a second action to track a status of the generated service ticket, a third action to notify at least one responsible party, and a fourth action to persist information that relates to the at least one error in the at least one log.

4. The method of claim 1, wherein the at least one onboarding request corresponds to a request to onboard the at least one user system, the onboarding relating to an integration of the at least one user system with a plurality of services in an enterprise network environment.

5. The method of claim 1, wherein receiving the at least one onboarding request further comprises:
receiving, by the at least one processor via the graphical user interface, at least one first user input, the at least one first user input including information that relates to the at least one user system;
automatically determining, by the at least one processor, whether supplemental user system data are required from the user based on the at least one first user input and a predetermined guideline;
generating, by the at least one processor based on a result of the determining, at least one graphical element, the at least one graphical element including at least one instruction for the user and an input field to receive at least one second user input; and
displaying, by the at least one processor via the graphical user interface, the at least one graphical element.

6. The method of claim 1, wherein the at least one application programming interface links the at least one user system with a plurality of services in an enterprise network environment.

7. The method of claim 1, wherein automatically testing the at least one communication interface further comprises:
generating, by the at least one processor, at least one task list for each of the at least one communication interface based on at least one predetermined criterion, the at least one task list including at least one test and at least one testing sequence; and
initiating, by the at least one processor, the at least one test according to the at least one testing sequence.

8. The method of claim 1, further comprising:
monitoring, by the at least one processor, a data stream that corresponds to each of the at least one communication interface; and
identifying, by the at least one processor, at least one issue that is associated with a downstream service based on the data stream.

9. A computing device configured to implement an execution of a method for facilitating automated system onboarding, the computing device comprising:
a processor;
a memory; and
a data transmission interface coupled to each of the processor and the memory,
wherein the processor is configured to:
receive, via a graphical user interface, at least one onboarding request from a user, the at least one onboarding request including at least one system parameter that corresponds to at least one user system;
automatically validate the at least one onboarding request and the at least one system parameter;
automatically generate, based on a result of the validating, at least one communication interface in response to the at least one onboarding request;
automatically test the at least one communication interface;
implement the at least one communication interface based on a result of the testing; and
generate at least one log, the at least one log including information that relates to the automatic validating, the automatic generating, and the automatic testing,
wherein, to automatically generate the at least one communication interface, the processor is further configured to:
automatically configure at least one application programming interface based on the at least one system parameter; and
automatically generate at least one key for the at least one user system, the at least one key enabling communication via the at least one application programming interface.

10. The computing device of claim 9, wherein the processor is further configured to:
automatically detect at least one error that corresponds to the at least one communication interface based on a result of the automatic testing;
automatically identify at least one resolution action for each of the at least one error; and
automatically initiate the at least one resolution action based on a predetermined setting.

11. The computing device of claim 10, wherein the at least one resolution action includes at least one from among a first action to generate a service ticket in an issue tracking platform, a second action to track a status of the generated service ticket, a third action to notify at least one responsible party, and a fourth action to persist information that relates to the at least one error in the at least one log.

12. The computing device of claim 9, wherein the at least one onboarding request corresponds to a request to onboard the at least one user system, the onboarding relating to an integration of the at least one user system with a plurality of services in an enterprise network environment.

13. The computing device of claim 9, wherein, to receive the at least one onboarding request, the processor is further configured to:
receive, via the graphical user interface, at least one first user input, the at least one first user input including information that relates to the at least one user system;
automatically determine whether supplemental user system data are required from the user based on the at least one first user input and a predetermined guideline;
generate, based on a result of the determining, at least one graphical element, the at least one graphical element including at least one instruction for the user and an input field to receive at least one second user input; and
display, via the graphical user interface, the at least one graphical element.

14. The computing device of claim 9, wherein the at least one application programming interface links the at least one user system with a plurality of services in an enterprise network environment.

15. The computing device of claim 9, wherein, to automatically test the at least one communication interface, the processor is further configured to:
generate at least one task list for each of the at least one communication interface based on at least one predetermined criterion, the at least one task list including at least one test and at least one testing sequence; and
initiate the at least one test according to the at least one testing sequence.

16. The computing device of claim 9, wherein the processor is further configured to:
monitor a data stream that corresponds to each of the at least one communication interface; and
identify at least one issue that is associated with a downstream service based on the data stream.

17. A non-transitory computer readable storage medium storing instructions for facilitating automated system onboarding, the storage medium comprising executable code which, when executed by a processor, causes the processor to:

receive, via a graphical user interface, at least one onboarding request from a user, the at least one onboarding request including at least one system parameter that corresponds to at least one user system;

automatically validate the at least one onboarding request and the at least one system parameter;

automatically generate, based on a result of the validating, at least one communication interface in response to the at least one onboarding request;

automatically test the at least one communication interface;

implement the at least one communication interface based on a result of the testing; and generate at least one log, the at least one log including information that relates to the automatic validating, the automatic generating, and the automatic testing, wherein to automatically generate the at least one communication interface, the executable code is further configured to cause the processor to:

automatically configure at least one application programming interface based on the at least one system parameter; and automatically generate at least one key for the at least one user system, the at least one key enabling communication via the at least one application programming interface.

18. The non-transitory computer readable storage medium of claim 17, wherein the at least one onboarding request corresponds to a request to onboard the at least one user system, the onboarding relating to an integration of the at least one user system with a plurality of services in an enterprise network environment.

* * * * *